United States Patent [19]

Hitachi

[11] Patent Number: 4,853,360

[45] Date of Patent: Aug. 1, 1989

[54] METHOD FOR MANUFACTURING THE METALLIC CARRIER BASE MATERIAL FOR MAINTAINING A CATALYST FOR EXHAUST GAS PURIFICATION

[75] Inventor: Yuzo Hitachi, Shizuoka, Japan

[73] Assignee: Usui Kokusai Sangyo Kabushiki Kaisha, Japan

[21] Appl. No.: 190,091

[22] Filed: May 4, 1988

[30] Foreign Application Priority Data

May 7, 1987 [JP] Japan .................. 62-109846

[51] Int. Cl.$^4$ .............................................. B01J 32/00
[52] U.S. Cl. ..................................... 502/439; 502/527
[58] Field of Search ................................ 502/439, 527

[56] References Cited

U.S. PATENT DOCUMENTS

| | | | |
|---|---|---|---|
| 4,186,172 | 1/1980 | Scholz ................................... | 422/180 |
| 4,316,823 | 2/1982 | Bozon et al. ......................... | 252/465 |
| 4,381,590 | 5/1983 | Nonnenmann et al. ........... | 29/157 R |
| 4,601,999 | 7/1986 | Retallick .............................. | 502/314 |
| 4,602,001 | 7/1986 | Cyron ................................... | 502/439 |
| 4,752,599 | 6/1988 | Nakamura et al. ............... | 502/527 X |

*Primary Examiner*—W. J. Shine
*Attorney, Agent, or Firm*—Lowe, Price, LeBlanc, Becker & Shur

[57] ABSTRACT

A method for manufacturing a metallic carrier base material having a multi-layer structure, if desired accommodated in a cylindrical case, for maintaining a catalyst for exhaust gas purification, wherein a multi-layer body having a number of screen-like vent holes in an axial direction is formed by piling up alternatively a planar band material and a corrugated band material made of thin nickel-plated steel strips, to furnish the contact portion. After inserting the multi-layer body into a cylindrical case, if desired, the multi-layer body or thus obtained composite is treated by immersion processing in a molten aluminum bath.

23 Claims, 2 Drawing Sheets

METHOD FOR MANUFACTURING THE METALLIC CARRIER BASE MATERIAL FOR MAINTAINING A CATALYST FOR EXHAUST GAS PURIFICATION

BACKGROUND OF THE INVENTION

1. Field of the Invention

The present invention relates to a metallic carrier base material for maintaining the catalyst for exhaust gas purification to be used generally by mounting in the middle of an exhaust gas pipe as a means to purify the exhaust gas of automobiles. Here, the "carrier base material" differs from the "carrier" as used in the field of chemistry' it means an implement used to maintain the catalyst supported by the carrier.

2. Description of Prior Art

In order to enlarge the carrier area per unit volume, i.e. to enlarge the effective contact area between the exhaust gas and the exhaust gas purification catalyst per unit volume, and to ensure the lightweight design for the metallic carrier base material itself, the metallic carrier base material has conventionally consisted of a multi-layer body of spiral or hierarchical form with a number of screen-like vent holes which pass exhaust gas in a certain direction. The planar band materials and the corrugated band materials are made of very thin heat-resistant steel strips of less than 0.1 mm in thickness, and are piled up alternatively to furnish the contact portion. The metallic carrier base material, composed of such multi-layer body material, is accommodated in a metal case with open ends when necessary. The bonding between the band materials themselves in the contact portion of the multi-layer body, or between the band material and the metal case, is performed by brazing, after the formation of the multi-layer body by electron beam welding or laser welding. This is described in the Japanese providional Patent Publications Nos. 54-13462, 57-1585, 56-4373, etc. Alternatively, bonding is performed by treating the band materials in advance with the brazing material of powdery or foil types.

OBJECT OF THE INVENTION

As with the above-mentioned heat-resistant steel strip, for example, the heat-resistant steel of chrome-aluminum-ferrite type, containing chrome of 15-25 weight % and aluminum of 2-5 weight %, the steel strip is not very easily rolled, and the material cost is expensive, because it is necessary to pass it repeatedly through the process of rolling annealing, until the thin material of the desired thickness, suitable for carrier base material, is obtained.

On the other hand, the conventional electron beam welding, or laser welding, requires special and expensive devices in the assembling and bonding to the multi-layer body. It is necessary to perform the troublesome and complicated operation such as spot welding at a narrow contact portion or an internal contact portion, and this results in lower productivity.

In the bonding method by brazing, special care has to be taken on the type and arrangement of brazing material or on the heating condition.

The object of the present invention is to form a metallic carrier base material by using a specific steel strip for easier rolling such as the thin strip material, to reduce the production cost of such thin materials, and to provide a metallic carrier base material for maintaining the catalyst for exhaust gas purification, whereby firm bonding is assured between the multi-layer band materials themselves, and heat-resistant properties and resistance to high temperature corrosion are exhibited between the band material and the case, so that detachment or displacement of the components may not occur due to the vibration during operation.

SUMMARY

In describing the advantageous features of the present invention, the first invention relates to the method for manufacturing a metallic carrier base material having a multi-layer body, for maintaining the catalyst for exhaust gas purification. A multi-layer body with a number of screen-like vent holes in an axial direction is formed by alternatively piling up a planar band material and a corrugated band material made of thin steel strips treated with nickel plating in advance, to furnish the contact portion, and then by treating the multi-layer body by immersing it into a molten aluminum bath.

The second invention also relates to the method for manufacturing a metallic carrier base material to maintain the catalyst for exhaust gas purification, by the use of a multi-layer body. The multi-layer body having a number of screen-like vent holes in an axial direction is formed by alternatively piling up the planar band materials and the corrugated band materials made of thin steel strips treated with nickel plating in advance, to furnish the contact portion, and by immersing it into a molten aluminum bath after the multi-layer body is accommodated in a cylindrical metal case.

The above-mentioned objects and advantages of the present invention will be more clearly understood when considered in conjunction with the accompanying drawings.

DETAILED DESCRIPTION OF THE PREFERRED EMBODIMENT

The structure of the metallic carrier base material according to this invention will be explained in conjunction with the drawings.

Figure 1:
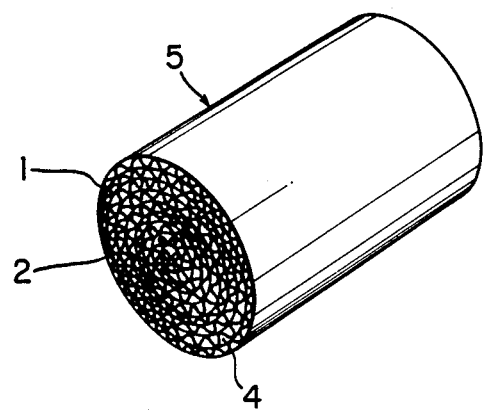
FIG. 1 is a perspective view of the metallic carrier base material of multi-layer structure according to an embodiment of this invention.
Figure 2:
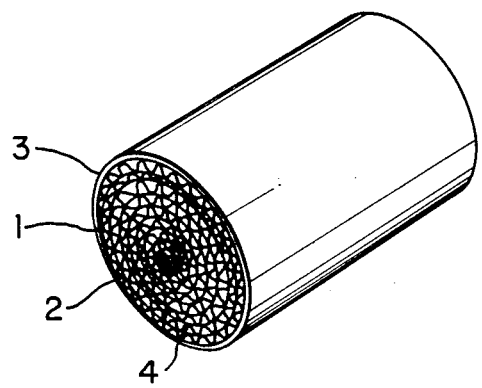
FIG. 2 represents a perspective view of the metallic carrier base material of FIG. 1, when it is housed in a metal case.
Figure 3:
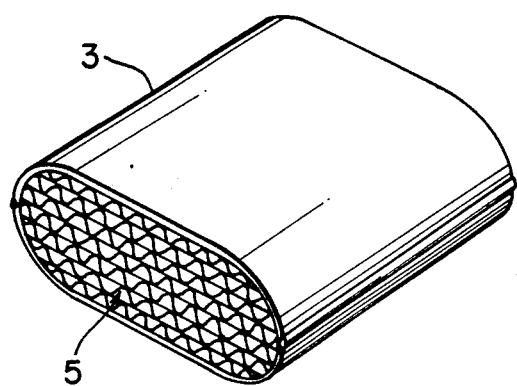
FIG. 3 is a perspective view of the metallic carrier base material of multi-layer structure, according to another embodiment of the invention when it is housed in a metal case.

The multi-layer structure as seen in FIG. 1 and FIG. 2 is wound up on spiral form whereas the multi-layer structure in FIG. 3 is piled up in hierarchical form.

Figure 4:
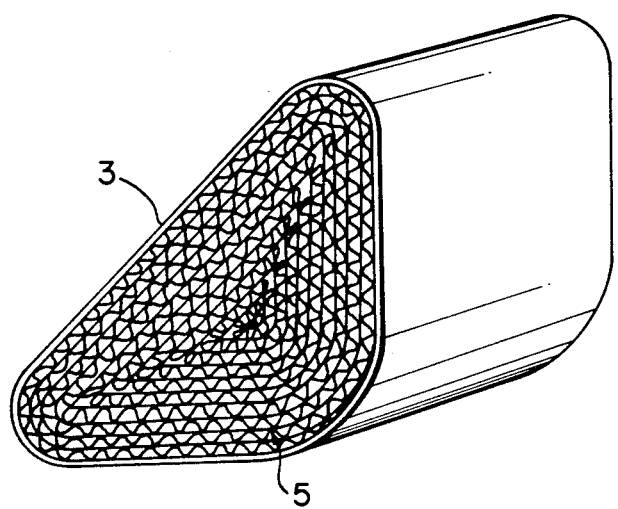
FIG. 4 shows a perspective view of the metallic carrier base material of multi-layer structure, according to still another embodiment of the invention, when it is housed in a metal case, whose cross-section has the form of a triangle.

In general, the catalytic converter for automotive exhaust gas is mounted in the underfloor tunnel of an automobile. Such an underfloor tunnel is usually shaped in the form of a triangle or a trapezoid to reduce the protuberance of floor in the compartment, and the case with triangular form as shown in FIG. 4 is well suited to the complicated shape of such a tunnel. Consequently, it is possible in such a case to effectively utilize the space of the tunnel.

It should be understood that the shape of the metallic carrier base material, according to he present invention, is not limited to the exact details of construction shown in these figures.

PLANAR BAND MATERIAL

The planar band material made of a thin steel strip used in the present invention is fabricated from the heat-resistant steel plate materials and quenched foils, made of low carbon steel, containing carbon of up to 0.15 weight %, or of chrome steel, containing carbon of up to 0.15 weight % and chrome of 0.15–30 weight %, by fabricating the material through hot and cold rolling to reduce its thickness to about 0.03–0.1 mm.

After the thin band material is treated with a cleaning process and then with an activation process, nickel-plated layers each of 5 microns in thickness are formed on both the front and back surfaces of the band material by normal electroplating procedures. The formation of this nickel-plated layer may be performed in the middle of the rolling process, and the thin band material may be rolled thereafter to obtain the material with the desired thickness.

The formation of the nickel-plated layer is of very important meaning because it aims to increase the heat-resistant property of the metallic carrier base material, in conjunction with the immersion processing in the molten aluminum bath (as described later), and to improve the bonding strength between the band materials themselves and between the metallic carrier base material and the metal case.

CORRUGATED BAND MATERIAL

The corrugated band material used in the present invention is fabricated by passing the band material between the forming gears.

FORMATION OF MULTI-LAYER BODY

The planar band material (1) and the corregated band material (2) thus fabricated, are piled up alternatively and wound up in spiral form, and a multi-layer body (5) having a number of screen-like vent holes (4) in an axial direction is formed. The multi-layer body (5) may be fabricated by cutting the band materials (1) and (2) into a certain length and by piling them up alternatively in hierarchical form.

The multi-layer body (5) thus fabricated, is to be the metallic carrier base material to maintain the catalyst for exhaust gas purification. The multi-layer body (5), i.e. the metallic carrier base material to maintain the catalyst for exhaust gas purification, may be fixed by spot welding when necessary and may be housed in a cylindrical metal case (3) with open ends.

MOLTEN ALUMINUM BATH

The multi-layer body (5) is treated with defatting and pickling processes in advance, and it is immersed into the molten aluminum bath of about 700°–800° C., promptly after flux treatment. The duration of the immersion processing is up to about 60 seconds, but it may last beyond the limit of 60 seconds. After taking the body from the bath, excessive aluminum is removed from the multi-layer body (5) by air blasting, and the body is then washed with hot water.

In the immersion process of the multi-layer body (5) in this molten aluminum bath, the aluminum-coated layers are formed on the front and back surfaces of the band materials (1) and (2), which constitute the multi-layer body. At the same time, aluminum in the aluminum layer is diffused into the plating layer during the heating in the immersion process. Thus, a layer of intermetallic compound, i.e. a nickel-aluminum alloy layer, is formed.

The formation of this nickel-aluminum alloy layer is very important because it increases the heat-resistant property an the resistance to high temperature corrosion of the metallic carrier base material.

Further, when the multi-layer body (5) is treated by the immersion process in the molten aluminum bath, contacting portions between the multi-layer band materials (1) and (2) are firmly bonded together. It seems that such form bonding of contracting portions is attained not only by the bonding between the aluminum layers themselves, formed on the surface of the band materials, but also by the bonding between the nickel-aluminum alloy layers formed by the immersion processing in the molten aluminum bath, and further, by the bonding between the nickel-aluminum-iron alloy layers effected by the alloying with iron in the band materials.

In the present invention, the nickel-aluminum alloy layer can be expanded by the secondary diffusion through heating in a non-oxidizing atmos pheric gas, in a vacuum or in a salt bath - for example, by heating to about 700° C. Thus, the heat-resistant property of the metallic carrier base material can be increased.

Also, the band materials (1) and (2), treated with nickel plating in advance and then with aluminum plating, may be used for the manufacture of the metallic carrier base material to maintain the catlyst for exhaust gas purification according to this invention.

As described above, the metallic carrier base material for maintaining the catalyst for exhaust gas purification according to this invention is manufactured by the immersion processing of the multi-layer body (5) itself, but also for multi-layer body accommodated in the metal case (3). In such case, the interior of the metal case (3) may be treated with nickel plating in advance. Thus, the contact portion between the multi-layer body (5) and the metal case (3) will be firmly fixed together by the bonding between the aluminum layers themselves and between the nickel-aluminum alloy layers themselves.

In the following, the inventio will be described in detail in connection with the examples, but it should be understood that the present invention is not limited to the exact details of such examples.

EXAMPLE 1

On the front and back surfaces of the planar band material consisting of thin steel strips made of low carbon steel (JIS G3141 SPCC) of 0.05 mm in thickness and 74.5 mm in width, a nickel plating layer of 6 microns in thickness was formed by electroplating. This planar band material was passed between the forming gears to fabricate the corrugated band material with a pitch of 5.0 mm between crests in a longitudinal direction and with a crest height of 2.5 mm. Both band materials thus fabricated were piled up one upon another, and were wound up in spiral form. By bonding the major points of the materials by spot welding, a multi-layer body of 70 mm in diameter, having a number of screen-like vent holes in an axial direction, was formed.

This multi-layer body was treated with a defatting and pickling process and was further immersed in the mixed molten salt bath, consisting of lithium chloride, potassium chloride, sodium chloride and sodium fluoride, to perform flux processing. Then, it was immersed into the molten bath of aluminum at 720° C. for 15 seconds. Excessive aluminum was then removed by air blasting and then the body was washed with hot water, and the metallic carrier base material having a heat-resistant and anti-corrosive coating layer was obtained.

EXAMPLE 2

The planar band material, consisting of thin steel strips made of chrome steel (JIS G4305 SUS 401L) (Chrome 13%) of 0.04 mm in thickness and 38 mm in width was treated with the cleaning and activation process. Then, a nickel plating layer of 5 microns in thickness was formed on both the front and back surfaces of the material by electroplating. The corrugated band material with a pitch of 3.5 mm between the crests in a longitudinal direction and with a crest height of 1.8 mm was fabricated by passing this planar band material between the forming gears. By a procedure similar to that of the embodiment 1, a multi-layer body in spiral form was formed with these two materials. Further, the metallic carrier base material of multi-layer structure was placed in a cylindrical metal case of about 70 mm in inner diameter, made of nickel-plated iron material. By a procedure similar to that of the embodiment 1, the immersion process was performed in the molten aluminum bath for 12 seconds, and the metallic carrier base material having a heat-resistant and anti-corrosion coating layer on its surface was obtained.

EVALUATION OF PERFORMANCE CHARACTERISTICS

The powder of activated alumina (gamma alumina) and the slurry with blended alumina sol were coated on the surface of the vent holes of the metallic carrier base material as obtained in the embodiment 1, and on the surface on the vent holes of the metallic carrier base material as obtained in the embodiment 2, and these were heated to 600° C., and the catalyst carrier layer was adhered to the surface of the vent holes of the metallic carrier base material. The specimens thus obtained were subjected to the test by performing 50 cycles of quick heating and quick cooling between normal temperature and 700° C. and by applying vibration. As a result, neither cracking nor detachment were observed on the joining portion and the coated layer of the specimens. This test proved that the metallic carrier base material according to the invention has excellent heat-resistant and shockproof properties.

EFFECTS OF THE INVENTION

Since the band materials used in the metallic carrier base material of the present invention consist of steel strips of low carbon steel or chrome steel, the material can be easily rolled and is also available at relatively low cost.

On the surface of the nickel-plated band material of the metallic carrier base material of the present invention, aluminum is diffused and coated by the immersion process in the molten aluminum bath. At the same time, the alloy layer containing nickel such as the nickel-aluminum inter-metallic compound is formed in the middle, and the coating layer thus fabricated provides excellent heat-resistant properties and the resistance to high temperature corrosion. By these coated alloy layers, firm bonding is assured for the contact portion between the multi-layer band materials themselves or for the contact portion between the band material and the metal case. And the welding or brazing process otherwise required can be eliminated.

What is claimed is:

1. A method for manufacturing a metallic carrier base material having a multi-layer structure for use in maintaining a catalyst for exhaust gas purification, comprising assembling alternate layers of a planar band material made of a thin nickel-plated steel strip and a corrugated band material made of a thin nickel-plated steel strip to form a multi-layer body having a plurality of screen-like vent holes in an axial direction, said multi-layer body serving as a contact portion, and immersion treating the multi-layer body in a molten aluminum bath.

2. A method for manufacturing a metallic carrier base material having a multi-layer structure for use in maintaining a catalyst for exhaust gas purification as set forth in claim 1, wherein the thin steel strips are made of low carbon steel or chrome steel.

3. A method as set forth in claim 1, wherein the low carbon steel contains up to 0.15 weight percent carbon.

4. A method as set forth in claim 2, wherein the chrome steel contains up to 0.15 weight percent carbon and 0.15–30 weight percent chrome.

5. A method as set forth in claim 1, wherein the thickness of the thin steel strips is about 0.03 to 0.1 mm.

6. A method as set forth in claim 1, wherein the multi-layer body is assembled in a bundled spiral form.

7. A method as set forth in claim 1, wherein the multi-layer body is assembled in hierarchical form.

8. A method as set forth in claim 1, wherein contacting portions of the planar band material and the corrugated band material are bonded by spot welding.

9. A method for manufacturing a metallic carrier base material having a multi-layer structure for use in maintaining a catalyst for exhaust gas purification as set forth in claim 1, wherein the immersion treatment in the molten aluminum bath is performed at a bath temperature of 700°–800° C.

10. A method for manufacturing a metallic carrier base material having a multi-layer structure for use in maintaining a catalyst for exhaust gas purification as set forth in claim 1, wherein the duration of the immersion treatment in the molten aluminum bath is up to about 60 seconds.

11. A method as set forth in claim 1, wherein after the multi-layer body is treated by immersion in the molten aluminum bath, excessive aluminum is removed by air blasting, and the resulting body is washed with hot water.

12. A method for manufacturing a metallic carrier base material having a multi-layer structure for use in maintaining a catalyst for exhaust gas purification, comprising assembling alternate layers of a planar band material made of a thin nickel-plated steel strip and a corrugated band material made of a thin nickel-plated steel strip to form a multi-layer body having a plurality of screen-like vent holes in an axial direction, said multi-layer body serving as a contact portion, providing the resulting multi-layer body in a cylindrical metal case, and immersion treating the encased multi-layer body in a molten aluminum bath.

13. A method for manufacturing a metallic carrier base material having a multi-layer structure as set forth in claim 12, wherein the thin steel strips are made of low carbon steel or chrome steel.

14. A method as set forth in claim 13, wherein the low carbon steel contains up to 0.15 weight percent carbon.

15. A method as set forth in claim 13, wherein the chrome steel contains up to 0.15 weight percent carbon and 0.15–30 weight percent chrome.

16. A method as set forth in claim 12, wherein the thickness of the thin steel strips is about 0.03 to 0.1 mm.

17. A method as set forth in claim 12, wherein the multi-layer body is assembled in a bundled spiral form.

18. A method as set forth in claim 12, wherein the multi-layer body is assembled in hierarchical form.

19. A method as set forth in claim 12, wherein the interior of the cylindrical metal case is treated with nickel plating in advance of receiving the multi-layer body.

20. A method as set forth in claim 12, wherein contacting portions of the planar band material and the corrugated band material are bonded by spot welding.

21. A method for manufacturing a metallic carrier base material having a multi-layer structure for use in maintaining a catalyst for exhaust gas purification as set forth in claim 12, wherein the immersion treatment in the molten aluminum bath is performed at a bath temperatue of 700°–800° C.

22. A method for manufacturing a metallic carrier base material having a multi-layer structure for maintaining a catalyst for exhaust gas purification as set forth in claim 12, wherein the duration of the immersion treatment in the molten aluminum bath is up to about 60 seconds.

23. A method as set forth in claim 12, wherein after the multi-layer body is treated by immersion in the molten aluminum bath, excessive aluminum is removed by air blasting, and then the resulting body is washed with hot water.

* * * * *